T. E. WOOD & W. H. SAFFORD, Jr.
LATHE GRINDER ATTACHMENT.
APPLICATION FILED JULY 27, 1914.
1,137,371.
Patented Apr. 27, 1915.
2 SHEETS—SHEET 1.
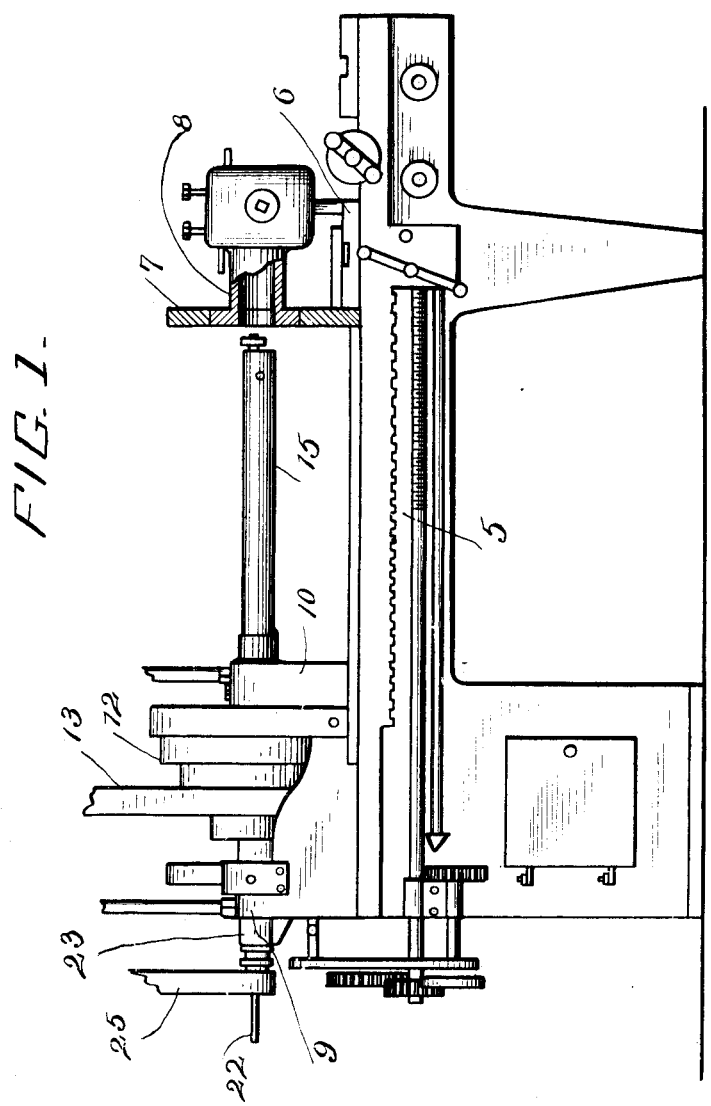

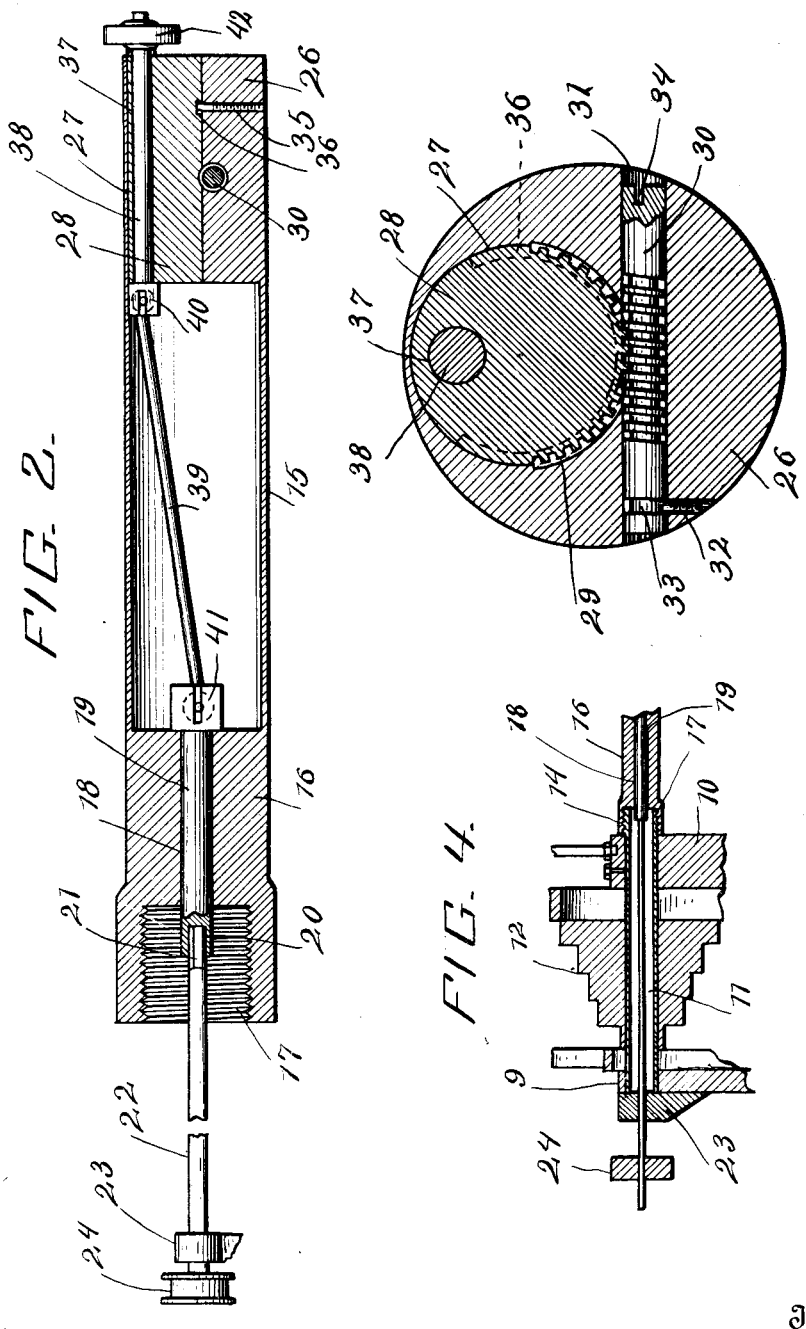

UNITED STATES PATENT OFFICE.

THOMAS E. WOOD AND WILLIAM H. SAFFORD, JR., OF GREAT FALLS, MONTANA.

LATHE GRINDER ATTACHMENT.

1,137,371.   Specification of Letters Patent.   Patented Apr. 27, 1915.

Application filed July 27, 1914. Serial No. 853,459.

*To all whom it may concern:*

Be it known that we, THOMAS E. WOOD and WILLIAM H. SAFFORD, Jr., citizens of the United States, residing at Great Falls, in the county of Cascade and State of Montana, have invented certain new and useful Improvements in Lathe Grinder Attachments, of which the following is a specification.

Our invention relates to a grinding attachment to be applied to or used in connection with lathes or milling machines.

An important object of the invention is to provide means of the above mentioned character, so constructed that the grinder may be driven by a rotatable shaft extending through the spindle of the lathe.

A further object of the invention is to provide an attachment of the above mentioned character, so constructed that the same will operate in a thorough and expeditious manner, and may be quickly and easily adjusted to operate upon work of different sizes.

A further object of the invention is to provide means of the above mentioned character, which are simple in construction, inexpensive to manufacture, strong, durable, and not liable to derangements.

Other objects and advantages of the invention will be apparent during the course of the following description.

In the accompanying drawings forming a part of this specification and in which like numerals are employed to designate like parts throughout the same, Figure 1 is a side elevation of a lathe having an attachment embodying my invention applied thereto, Fig. 2 is an enlarged central longitudinal sectional view through the rotatable grinder carrier or cylinder, Fig. 3 is a transverse sectional view taken on line 3—3 of Fig. 2, and Fig. 4 is a central longitudinal sectional view through the lathe spindle and associated elements.

In the drawings, wherein for the purpose of illustration is shown a preferred embodiment of our invention, the numeral 5 designates a table or body portion of the lathe, upon which are mounted the operating elements of the same. Adapted to move longitudinally of the table 5 is a carriage 6, having an angle plate 7, secured thereto. Rigidly connected with this angle plate 7 by any suitable means is a cylinder or cylinders 8, to be ground, as shown. The carriage 6 may be moved longitudinally of the table by the automatic feed means or manually, as the well known construction in the ordinary lathe. Arranged adjacent the opposite end of the table 5 are stationary bearings 9 and 10, through which is journaled a horizontal tubular spindle 11, of the ordinary lathe construction. This lathe spindle constitutes the operating element of the lathe, and while it is free to rotate, the same cannot partake of perceptible longitudinal or lateral movements. The lathe tubular spindle 11 is driven or rotated by a step-pulley 12 receiving its rotation from a belt 13, as shown. The inner end of the lathe tubular spindle 11 extends inwardly beyond the bearing 10, and is externally screw-threaded, as shown at 14, for engagement with suitable apparatus, or the cylinder or grinder carrier of my attachment, to be next described.

My attachment or apparatus comprises a preferably horizontally arranged grinder carrier or cylinder 15, which as more clearly shown in Fig. 2, has its attaching end 16 preferably formed solid and provided with an internally screw-threaded axial bore or opening 17, having screw-threaded engagement with the inner screw-threaded end of the lathe tubular spindle. This tubular cylinder or grinder carrier is straight and concentrically connected with the tubular spindle, in end to end relation. While this is the preferred manner of connecting the grinder carrier or cylinder with the lathe tubular spindle, I wish it understood that the invention is in no sense solely restricted to such connection as the same may be effected by other suitable means. It is obvious that the grinder carrier or cylinder 15 is rotated upon its longitudinal axis with the lathe tubular spindle.

The solid portion 16 of the grinder carrier or cylinder 15 is provided centrally thereof with an axially extending opening or bore 18, to receive a shaft 19 rotatable with relation to the grinder carrier or cylinder carrier or cylinder 15. The shaft 19 has its outer end extending into the lathe tubular spindle and is provided with an axially extending opening or bore 20, formed square in cross-section or other than round, to receive the end 21, formed square in cross-section or other than round, of a drive shaft 22, which extends through the lathe tubular spindle 11, and is preferably journaled through a bearing 23. The driving shaft 22 receives its rotation from a grooved pulley 24 rigidly attached to the outer end thereof, the same being driven by a belt 25 or the like. Particular attention is called to the fact that the driving shaft 22, which operates the grinder cylinder to be referred to, extends through the lathe tubular spindle, these two elements being rotatable with relation to each other.

As more clearly shown in Figs. 2 and 3, the inner end of the grinder carrier or cylinder 15 is preferably provided with a head or solid portion 26, having a cylindrical axial opening or bore 27, eccentrically arranged with relation thereto. Mounted to turn or rotate within the bore 27 is a concentric feed bearing 28, provided upon one side, preferably the inner side, with screw or worm teeth 29, to engage with the teeth of a feed worm 30, extending through an opening 31 in the head or solid portion 26. The feed worm 30 may be held against longitudinal movement by any suitable means, an illustration of the same being a screw or bolt 32, operating within an annular groove 33 formed in the end worm 30. The opposite end of the feed worm 30 is preferably provided with an opening or recess 34, to receive the end of a key or other suitable tool, for turning the same. In Fig. 2, the eccentric feed bearing 28 is shown as being held against perceptible longitudinal movement with respect to the head or solid portion 26 by a screw or bolt 35, the inner end of which extends into a curved groove 36, formed upon the eccentric feed bearing. The eccentric feed bearing 28 is provided with an axial opening or bore 37, arranged eccentric with relation thereto, for receiving an eccentric grinder shaft or arbor 38. The inner end of the grinder shaft 38 is connected with a coupler-shaft 39 by a universal joint 40, the opposite end of the coupler-shaft 39 being connected with the shaft 19 by a universal joint 41. Rigidly secured to the outer end of the grinder shaft or arbor 38 is a grinder or grinder wheel 42 of any well known or preferred type.

The operation of the apparatus is as follows:—The work, in this instance the cylinder or cylinders 8, is placed in position upon the carriage of the lathe to be moved therewith, such movement being effected automatically or manually. The carriage is advanced sufficiently whereby the grinder or grinding wheel 34 will enter the bore of the cylinder, to grind the same. During this grinding operation, the grinder 42 partakes of a planetary movement, that is it is bodily rotated with the grinder carrier or cylinder 15, and also rotates upon its axis with relation thereto. The grinder may be fed or advanced by proper manipulation of the feed worm 30, which turns the concentric feed bearing 28. The grinder 42 is driven from or by the driving shaft 22, extending axially through the lathe tubular spindle, which effects the rotation of the grinder carrier or cylinder.

It is to be understood that the form of our invention herewith shown and described is to be taken as a preferred example of the same, and that various changes in the shape, size, and arrangement of parts may be resorted to without departing from the spirit of the invention or the scope of the subjoined claims.

Having thus described our invention, we claim:—

1. The combination with the tubular spindle of a lathe or like machine, of a substantially straight tubular grinder carrier concentrically connected with one end of the tubular spindle in end to end relation thereto, a rotatable feed bearing arranged within the tubular grinder carrier and being eccentric with relation thereto, a grinder shaft extending longitudinally within the tubular grinder carrier and journaled through the feed bearing, a grinder carried by the outer end of the grinder shaft, a driving shaft extending through the tubular spindle and having connection with the grinder shaft, and means to turn the feed bearing.

2. An attachment to be connected with the rotatable tubular spindle of a lathe, comprising a tubular body portion to be concentrically connected with the tubular spindle, a rotatable feed bearing eccentrically mounted within the tubular body portion, means to turn the feed bearing with relation to the body portion, a grinder carrying shaft extending within the tubular body portion and through the feed bearing, and a driving shaft extending through the tubular body portion and having operative connection with the grinder carrying shaft.

3. The combination with the tubular spindle of a lathe or like machine, of a tubular grinder carrier connected therewith to be rotated thereby, an eccentric feed bearing extending longitudinally within the tubular grinder carrier and having an eccentric opening, a grinder shaft rotatable within the eccentric opening of the eccentric feed bearing, means to turn the eccentric feed bearing with relation to the grinder carrier, a grinder shaft rotatable within the opening of the eccentric feed bearing, a grinder secured to the outer portion of the grinder shaft, a driving shaft extending longitudinally within the tubular spindle, a coupling shaft having universal connections with the driving shaft and the grinder shaft, means to rotate the driving shaft, and means to rotate the tubular spindle.

In testimony whereof we affix our signatures in presence of two witnesses.

THOMAS E. WOOD.
WILLIAM H. SAFFORD, Jr.

Witnesses:
JULIUS PETERS,
LA RUE SMITH.

Copies of this patent may be obtained for five cents each, by addressing the "Commissioner of Patents, Washington, D. C."